(12) United States Patent
Bradt et al.

(10) Patent No.: US 8,852,450 B2
(45) Date of Patent: Oct. 7, 2014

(54) DEICING FORMULATION UTILIZING CO-PRODUCTS FROM LIGNOCELLULOSE TO BIO FUEL PROCESS

(75) Inventors: Christopher Bruce Bradt, LaSalle (CA); Richard Romeo Lehoux, Windsor (CA); Mark Isaac Schwartz, Woodbridge (CA); Demetre Spanos, Windsor (CA)

(73) Assignee: GreenField Specialty Alcohols Inc., Toronto, Ontario (CA)

( * ) Notice: Subject to any disclaimer, the term of this patent is extended or adjusted under 35 U.S.C. 154(b) by 0 days.

(21) Appl. No.: 13/822,413

(22) PCT Filed: Sep. 13, 2011

(86) PCT No.: PCT/CA2011/050557
§ 371 (c)(1),
(2), (4) Date: Mar. 12, 2013

(87) PCT Pub. No.: WO2012/034230
PCT Pub. Date: Mar. 22, 2012

(65) Prior Publication Data
US 2013/0175467 A1   Jul. 11, 2013

Related U.S. Application Data

(60) Provisional application No. 61/382,264, filed on Sep. 13, 2010.

(51) Int. Cl.
*C09K 3/18* (2006.01)
*C13K 1/02* (2006.01)
*C09K 5/10* (2006.01)

(52) U.S. Cl.
CPC ... *C09K 5/10* (2013.01); *C13K 1/02* (2013.01); *C09K 3/18* (2013.01); *C09K 3/185* (2013.01)
USPC .............................................. 252/70; 106/13

(58) Field of Classification Search
CPC ............ C09K 3/18; C09K 3/185; C12F 3/00; C12F 3/12; C13K 1/02
USPC .............................................. 252/70; 106/13
See application file for complete search history.

(56) References Cited

U.S. PATENT DOCUMENTS

| 4,664,832 | A  | * | 5/1987 | Sandvig et al. | ........... 252/70 |
| 5,264,623 | A  |   | 11/1993 | Oehr et al. | |
| 6,080,330 | A  |   | 6/2000 | Bloomer | |
| 6,149,834 | A  |   | 11/2000 | Gall et al. | |
| 2002/0117167 | A1 | * | 8/2002 | Schmidt et al. | ........... 127/36 |
| 2010/0065128 | A1 | * | 3/2010 | Benson et al. | ........... 137/2 |
| 2012/0055466 | A1 | * | 3/2012 | Cotti Comettini et al. | ..... 127/37 |

FOREIGN PATENT DOCUMENTS

| CA | 2678976 | 3/2010 | |
| WO | 01/64811 | 9/2001 | |
| WO | 02/26910 | 4/2002 | |
| WO | WO2009/026707 A1 * | 3/2009 | ........... C05F 5/00 |

OTHER PUBLICATIONS

Hamelinck et al., "Ethanol from lignocellulosic biomass: techno-economic performance in short—, middle- and long-term", Biomass and Bioenergy, 2005, available online Dec. 22, 2004, vol. 28, pp. 384-410.
Harris et al., "Synthesis, regulation and utilization of lignocellulosic biomass", Plant Biotechnology Journal, accepted for publication Aug. 18, 2009, published 2010, vol. 8, pp. 244-262.
International Patent Application No. PCT/CA2011/050557, International Search Report dated Dec. 5, 2011.

* cited by examiner

*Primary Examiner* — Anthony J Green
(74) *Attorney, Agent, or Firm* — Mukundan Chakrapani; Borden Ladner Gervais LLP

(57) ABSTRACT

The use of a side stream and residue from the lignocellulose to ethanol process for use in preventing the formation of ice and in melting ice and snow on roadways. The future lignocellulose to ethanol industry will provide a significant proportion of these streams that provide an organic solution that when added to chloride salts of calcium, magnesium and sodium provides an improved environmentally friendly road deicing product with reduced corrosiveness and increased friction. A deicer composition of calcium chloride aqueous solution containing 25-38% by weight calcium chloride mixed up to 50% by volume of hemicellulose hydrolysis side stream can reduce the corrosivity of calcium chloride to 70% less that of a sodium chloride solution.

24 Claims, 9 Drawing Sheets

DEICING FORMULATION UTILIZING CO-PRODUCTS FROM LIGNOCELLULOSE TO BIO FUEL PROCESS

FIELD OF THE INVENTION

The present invention generally relates to the use of by-products from lignocellulosic biomass processing as a deicing formulation or to improve properties of deicing formulation with by-products from lignocellulosic biomass included to improve properties of the deicing formulation including corrosion inhibition, improved friction, and improved colloidal dispersion of the deicing formulation.

BACKGROUND OF THE INVENTION

Sodium chloride and magnesium chloride solutions have been used for deicing of roads and roadway structures for many years. Sodium chloride is readily available and inexpensive. However, the use of sodium chloride has several disadvantages; it has an adverse effect on roadside vegetation and groundwater, and it severely corrodes roadside barriers, bridges and the like, as well as the vehicles that drive over them. This adds to the overall costs of using sodium chloride. Thus, a search has been ongoing for some time to replace sodium chloride as a deicer with a less corrosive material.

Other salts have been suggested, but either they are too expensive, unavailable in quantity, or they are also corrosive.

Calcium chloride is less corrosive than sodium chloride, but it is still corrosive to metals. The use of calcium chloride as a deicer composition is advantageous because it generates heat when it comes in contact with solidified water, such as snow and/or ice, further promoting deicing.

Various corrosion inhibitors have been tried for calcium chloride. For example the use of chromates as corrosion inhibitors for calcium chloride brine solutions is known; however, the use of chromates is being discouraged because they harm the environment. The use of nitrites such as sodium, calcium, potassium and the like, has also been suggested, but a high level of nitrites in calcium chloride is required as a corrosion inhibitor. Other known corrosion inhibitors include phosphates, borates, amines, molybdates, hydroquinone, gluconates and impure sugar sources such as molasses. However, none of them will inhibit corrosion to the required level.

Biomass to fuel processes typically use a physiochemical process to treat the biomass and to hydrolyze the sugar polymers in preparation for fermentation. A common drawback to these methods is the overall low yield and the presence of significant residual materials whether they are side streams of various process steps or residues remaining after the primary fermentive process has occurred. These side streams and residues represent a significant amount of material and its productive and value added reclamation is important for commercial viability of these processes.

Pentose based sugars constitute a significant portion of the lignocellulosic biomass. The lack of a fermentive organism that can convert these sugars exaggerates the issue of maximizing process yield and economics. A significant amount of residual materials, such as these pentose sugars, are produced in the lignocellulosic biomass to fuel process and must be disposed of at additional cost.

SUMMARY OF THE INVENTION

It is now an object of the present invention to provide a process which overcomes at least one of the above disadvantages of metal chloride deicing compositions.

The inventors have surprisingly discovered that residual materials from the lignocellulosic biomass to fuel process can be used either on their own or as additives in a road deicing formulation to improve the performance of the formulation and/or reduce its environmental impact. This value added use of the process residuals provides for additional revenue generation and improved commercial viability of the lignocellulose to fuel process.

In currently available deicing compositions, chloride salts of sodium, calcium and magnesium, including that of rock salt, have many disadvantages when used as road deicers. However, the inventors have surprisingly discovered that the addition of the concentrated side stream from lignocellulose biomass pretreatment, including the hemicelluloses and hydrolyzed parts thereof, can reduce the drawbacks of commercial formulations by reducing their corrosive properties, significantly increasing film forming ability, improving time to dry, increasing friction, and preventing the crystal formation in liquid solutions.

It is a further object of the invention to provide a series of formulations that utilize fractionated or unfermented residuals from the lignocellulose to ethanol process in combination with various road deicing salts to produce useful road deicing formulations that possess positive qualities.

In one aspect, the stream utilized is a fractionated hemicelluloses degradation stream from a lignocellulose to ethanol process. In that process, the biomass is first pretreated by steam treatment for a particular time and at a selected temperature and then washed with a water based diluent. This affords a dilute side stream that is predominantly hemicelluloses and hydrolyzed parts of the hemicellulose polymer consisting primarily of xylooligosaccharides and xylose. The dilute side stream is preferably concentrated and then mixed with salt or salt solutions of Calcium Chloride, Magnesium Chloride or Sodium Chloride, or any combination thereof. It is possible to use Brine solutions, which are mixtures of Calcium, Magnesium and Sodium salts.

The inventors have now found that an inexpensive, non-corrosive, deicing and ice formation inhibiting composition which provides improved colloidal dispersion and/or friction properties to a substance which it is applied can be prepared by combining a composition comprising sodium, calcium, magnesium and/or chloride aqueous solutions with products derived from a lignocellulosic biomass to fuel conversion process, for example containing up to 50% by weight of hemicellulose. The non-corrosive formulations may optionally contain from 3-5% by volume of hemicellulose and still comply with criteria of a 70% reduction in corrosion with respect to that of sodium chloride solutions.

The inventors have also found that a deicing and ice formation inhibiting composition which is less harmful to the environment con be obtained using by-products of a ligncellulosic biomass processing which has been subjected to a hydrolysis pre-treatment step, for example dilute acid pre-treatment ("DAP") or high pressure autohydrolysis ("HPA").

In one aspect, the present disclosure describes an additive for improving properties of a surface ice melting and/or ice formation inhibiting composition, the additive comprising products derived from a lignocellulosic biomass to fuel conversion process.

Preferably, the products derived from the lignocellulosic biomass to fuel conversion process comprise water soluble hydrolysed hemicellulose comprising carbohydrates of various degrees of polymerization, sugar monomers, acetic acid, furfural and other hemicellulose lignocellulosic degradation products.

Preferably, the improved properties include reducing corrosion activity of the ice melting and/or ice formation inhibiting composition.

Preferably, the improved properties include increasing friction properties of the ice melting and/or ice formation inhibiting composition.

Preferably, the improved properties include improving colloidal dispersivity of the ice melting and/or ice formation inhibiting composition.

Preferably, the additive further comprises formic acid.

Preferably, the additive includes water soluble xylose and xylooligosaccharides of various molecular weights.

Preferably, the lignocellulosic biomass to fuel conversion process is a thermal steam treatment process and the additive comprises a water soluble hydrolysis product that was separated from a solid lignocellulose biomass fraction during the thermal steam treatment process.

Preferably, the hydrolyzed hemicellulose is concentrated by evaporation of water after washing.

Preferably, the hydrolyzed hemicellulose is concentrated to 25% to 70% total solids.

Preferably, the pH is increased to between 6 and 8 using a base.

Preferably, the base is selected from the group consisting of Calcium Carbonate, Magnesium Carbonate, Calcium Hydroxide, Sodium Hydroxide, Potassium hydroxide, Potassium Carbonate, ammonium hydroxide and mixtures thereof.

Preferably, the additive is used in an application to rock salt prior to road application for deicing and/or ice formation inhibition.

Preferably, the additive is used for keeping salts in a liquid salt composition in suspension.

Preferably, the additive is added to water solutions of NaCl, CaCl and MgCl or mixtures thereof as a surface ice melting and ice formation inhibiting salt composition.

Preferably, the additive is added to aqueous brine solutions of NaCl, $CaCl_2$, or $MgCl_2$ or mixtures thereof up to 50/50 weight ratio as a surface ice melting and ice formation inhibiting salt composition.

Preferably, the additive is mixed 1:1 with a NaCl solution then further blended with a $CaCl_2$ solution to form a surface ice melting and ice formation inhibiting salt composition with increased friction properties.

Preferably, the additive is mixed 1:1 with a 23% NaCl solution then further blended with a $CaCl_2$ solution to form a surface ice melting and ice formation inhibiting salt composition with increased friction properties.

Preferably, the additive is mixed 1:1 with 23% NaCl solution then blended with 30% $CaCl_2$ solution at a ratio of 30:70 solution to form a surface ice melting and ice formation inhibiting salt composition with increased friction properties.

Preferably, the additive is mixed 1:1 with 23% NaCl solution then blended with 30% $CaCl_2$ solution at a ratio of 20:80 solution to form a surface ice melting and ice formation inhibiting salt composition with increased friction properties.

Preferably, the additive is mixed with salt solutions of $CaCl_2$, $MgCl_2$, or NaCl and mixtures thereof to provide a surface ice melting and ice formation inhibiting salt composition with increased friction properties.

In another aspect, the present disclosure describes a surface ice melting and/or ice formation inhibiting composition, the composition comprising products derived from a lignocellulosic biomass to fuel conversion process.

Preferably, the products derived from the lignocellulosic biomass to fuel conversion process comprise water soluble hydrolysed hemicellulose comprising carbohydrates of various degrees of polymerization, sugar monomers, acetic acid, furfural and other hemicellulose lignocellulosic degradation products.

Preferably, the composition has improved properties including reducing corrosion activity of the ice melting and/or ice formation inhibiting composition.

Preferably, the composition has improved properties including increasing friction properties of a surface to which the ice melting and/or ice formation inhibiting composition is applied.

Preferably, the composition has improved properties including improving colloidal dispersivity of the ice melting and/or ice formation inhibiting composition.

Preferably, the composition comprises formic acid.

Preferably, the composition includes water soluble xylose and xylooligosaccharides of various molecular weights.

Preferably, the lignocellulosic biomass to fuel conversion process is a thermal steam treatment process and the additive comprises a water soluble hydrolysis product that was separated from a solid lignocellulose biomass fraction during the thermal steam treatment process.

Preferably, the thermal steam treatment process uses a acid catalyst such as sulfuric acid.

Preferably, the hydrolyzed hemicellulose is concentrated by evaporation of water after washing.

Preferably, the hydrolyzed hemicellulose is concentrated to 25% to 70% total solids.

Preferably, the pH is increased to between 6 and 8 using a base.

Preferably, the base is selected from the group consisting of Calcium Carbonate, Magnesium Carbonate, Calcium Hydroxide, Sodium Hydroxide Potassium Carbonate, Potasium Hydroxide, Ammonium Hydroxide, and mixtures thereof.

Preferably, the composition is mixed 1:1 with a NaCl solution then further blended with a CaCl2 solution to form a surface ice melting and ice formation inhibiting salt composition with increased friction properties.

Preferably, the composition is mixed 1:1 with a 23% NaCl solution then further blended with a CaCl2 solution to form a surface ice melting and ice formation inhibiting salt composition with increased friction properties.

Preferably, the composition is mixed 1:1 with 23% NaCl solution then blended with 30% CaCl2 solution at a ratio of 30:70 solution to form a surface ice melting and ice formation inhibiting salt composition with increased friction properties.

Preferably, the composition is mixed 1:1 with 23% NaCl solution then blended with 30% CaCl2 solution at a ratio of 20:80 solution to form a surface ice melting and ice formation inhibiting salt composition with increased friction properties.

Preferably, the composition is mixed with salt solutions of CaCl2, MgCl2, or NaCl and mixtures thereof to provide a surface ice melting and ice formation inhibiting salt composition with increased friction properties.

Preferably, the products derived from the lignocellulosic biomass to fuel conversion process were subjected to a pretreatment step of hydrolysis.

Preferably, the products derived from the lignocellulosic biomass to fuel conversion process comprise: approximately 6-8% arabinose and arabian oligomers; approximately 48-72% xylose and xylan oligomers; approximately 0-1% mannose and mannan oligomers; 2.5-3.5% galactose and galactan oligomers; approximately 8-11% glucose and glucose oligomers, approximately 2-3% sulphuric acid, and a balance of salts, protein, fat, dissolved lignin and resins.

Preferably, a base selected from the group consisting of potassium carbonate and ammonium hydroxide is added to the composition to adjust the pH to between 6 and 8.

Preferably, the products derived from the lignocellulosic biomass to fuel conversion process comprise: approximately 4-6% arabinose and arabian oligomers; approximately 40-60% xylose and xylan oligomers; approximately 0-1% mannose and mannan oligomers; 2-3% galactose and galactan oligomers; approximately 5.5-7.5% glucose and glucose oligomers, and a balance of salts, protein, fat, dissolved lignin and resins.

Preferably, a base selected from the group consisting of potassium carbonate and ammonium hydroxide is added to the composition to adjust the pH to between 6 and 8.

In another aspect, the disclosure describes the use of the composition of claim 11 for application to rock salt prior to road application for deicing and/or ice formation inhibiting.

In another aspect, the disclosure describes the use of the composition for keeping salts in a liquid salt composition in suspension.

In another aspect, the disclosure describes the use of the composition for addition to water solutions of NaCl, CaCl2, and MgCl2 or mixtures thereof as a surface ice melting and ice formation inhibiting salt composition.

In another aspect, the disclosure describes the use of the composition added to aqueous brine solutions of NaCl, CaCl2, or MgCl2 or mixtures thereof up to 50/50 weight ratio as a surface ice melting and ice formation inhibiting salt composition.

BRIEF DESCRIPTION OF THE DRAWINGS

Other objects and advantages of the invention will become apparent upon reading the detailed description and upon referring to the drawings in which.

DETAILED DESCRIPTION OF PREFERRED EMBODIMENTS

Figure 1:
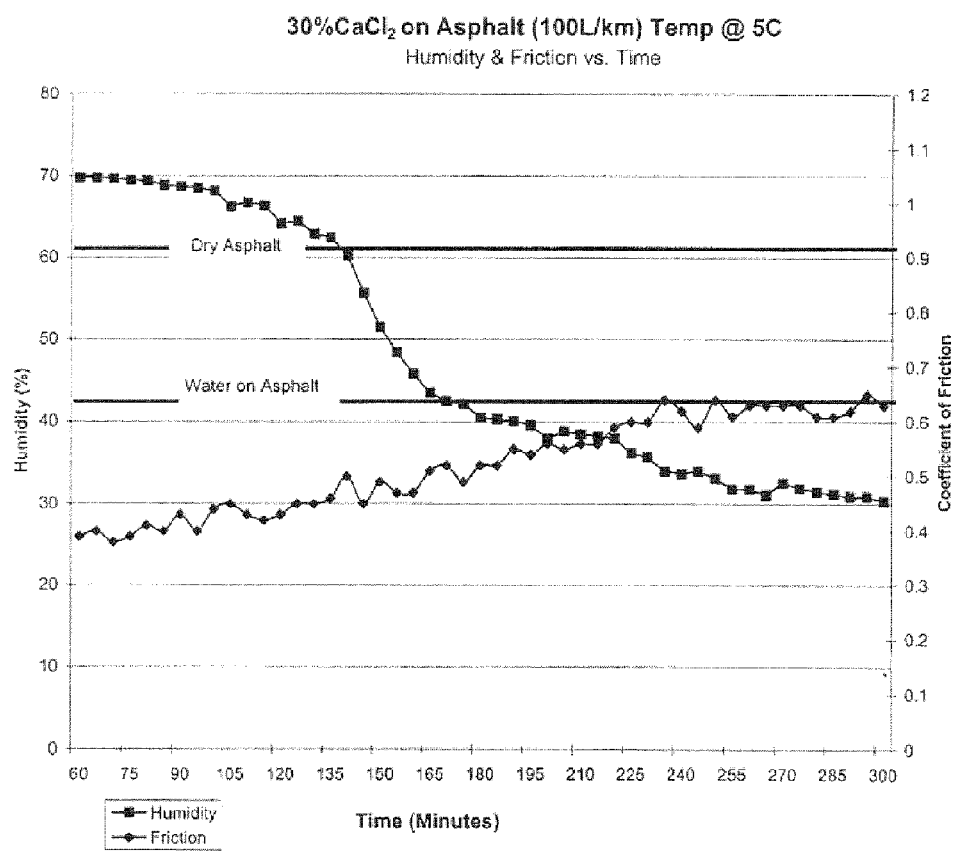
FIG. 1 shows a graph of humidity and friction versus time for 30% $CaCl_2$ on Asphalt (100 L/Km) at a temperature of 5° C.

Before explaining the present invention in detail, it is to be understood that the invention is not limited to the preferred embodiments contained herein. The invention is capable of other embodiments and of being practiced or carried out in a variety of ways. It is to be understood that the phraseology and terminology employed herein are for the purpose of description and not of limitation.

The invention is directed to the use of side streams and residuals from lignocellulose to ethanol processes and especially lignocellulose pretreatment processes in deicing compositions. In particular, the invention is directed to new uses for the pretreatment side stream including hemicelluloses and hydrolyzed parts thereof, and to new road deicing and/or ice formation inhibiting compositions including this side stream. It is intended that the term "deicing" would be understood as also referring to "ice formation inhibiting" if not specifically mentioned in this disclosure.

Calcium chloride and magnesium chloride are commercially available in the form of brine solutions at various concentrations, and as a solid product. The solutions can be shipped as an 18-45% by weight solution of calcium chloride with the resulting concentrations being a suitable deicer composition. The magnesium chloride is shipped as an 18-35% solution. Untreated, these solutions are very corrosive to metals such as bridge structures, concrete barriers, metal signs and lighting, as well as vehicles and application equipment. These solutions also tend to reduce the friction between the road and vehicle. Useful calcium chloride solutions contain from about 18-38% by weight of calcium chloride and contain up to 1.0 ppm of free chlorine, derived from calcium hypochlorite. When the calcium chloride is used as flake or pellet, it can be sprayed with an additive in the desired amounts to obtain the desired reduction in corrosion and improved road friction.

The inventors have found that products derived from a lignocellulosic biomass to fuel conversion process including hemicellulose, sometimes referred to as hemicellulose degradation side stream, is an effective anti-corrosion agent for deicing and ice formation inhibiting products such as calcium chloride, magnesium chloride and sodium chloride. The corrosion inhibited solutions have a freezing point of less than 0° F. and can be maintained to −20° F. without agitation. The inventors have also found that the addition of the hemicellulose degradation side stream also improves the friction characteristics of the salt deicing solutions when these solutions are applied to a surface.

To prepare the hemicellulose hydrolysis for handling and storage, the hemicellulose is mixed into a 20-40% calcium chloride solution in a 1:1 ratio. This resulting mixture both stabilizes the hemicellulose from possible crystallizing and permits the hemicellulose to be dispensed at ambient temperatures to 0 degrees F.

Corrosion testing was done according to NACE Standard TM-01-69 PNS modified. In accordance with this test, mild steel metal samples or coupons, are cleaned, dried and weighed and, over a period of 72 hours, are alternately dipped into a brine solution for 10 minutes and withdrawn from the solution and exposed to air for 50 minutes. The coupons were 1.25"OD×0.25"ID×0.03125". They were weighed before and after the above test, and the amount of metal lost was determined as corrosion. Corrosion was expressed as mils per year (MPY).

Various concentrations of hemicellulose were tested as a corrosion inhibitor including (A) 25%/wt and (B) 29%/wt and the results are shown below.

| Hemicellulose | Concentration, %/Vol | Corrosion Reduction, % |
|---|---|---|
| B | 0.1 | 10.6 |
| A | 0.5 | 16.9 |
| B | 1.0 | 28.5 |
| A | 2.0 | 58.1 |
| B | 3.0 | 72.1 |
| A | 4.0 | 70.4 |
| B | 5.0 | 74.9 |
| A | 6.0 | 75.5 |
| B | 7.0 | 76.7 |
| A | 8.0 | 74.2 |
| B | 9.0 | 78.5 |
| A | 10.0 | 77.2 |

The pH of the raw hemicellulose is approximately 3.0. Addition of the hemicellulose to a calcium chloride or magnesium chloride brine solution results in the respective solution's pH being reduced. A deicer with a pH of less than 6.0 is neither environmentally desirable nor easily acceptable for use. The pH of the hemicellulose was adjusted with calcium carbonate, calcium hydroxide, magnesium carbonate, potassium carbonate, ammonium hydroxide and mixtures thereof or another alkaline source to ensure that the overall pH of the resulting solution remained above 6.0. When the pH of hemicellulose was adjusted to above 7.0, the acetic acid initially present was converted to acetate. This provided an additional advantage in that the acetate provided additional desirable properties in being non corrosive and imparting a low freezing point to the overall composition.

In one embodiment of the invention, the side stream from lignocellulose biomass pretreatment, including the hemicelluloses and hydrolyzed parts thereof, was a fractionated hemicelluloses degradation stream form a lignocellulose to ethanol process. The side stream was obtained by steam treating corncobs in a corncob pretreatment process and washing with water prior to enzymatic hydrolysis. The wash water stream generated was then concentrated to about 30%-60% solids. This concentrated solution predominantly contained hemicelluloses, hydrolysed hemicelluloses of various degrees of polymerization, sugar monomers, acetic acid, furfural and another lignocellulosic degradation products created in the steam treating process. This washing stream is referred to in the following as the concentrated Xylose/Xylooligosaccharide stream the predominate component.

The concentrated Xylose/Xylooligosaccharide stream was pH adjusted to neutrality with calcium/magnesium carbonate and mixed with a chloride salt of sodium, calcium or magnesium, or a mixture thereof, up to a 50/50 weight percent basis. Preferably, the concentrated Xylose/Xylooligosaccharide stream is mixed with a combination of all three salts up to a 50/50 weight ratio of stream to salts. The concentrated Xylooligosaccharide stream can also be applied directly to rock salt, which is a combination of chloride salts primarily sodium chloride, prior to spreading, in order to improve the properties of this typical deicing application. The concentrated xylose/Xylooligosachride stream can also be applied on its own.

The added concentrated Xylose/Xylooligosaccharide stream of this solution acts as a corrosion inhibitor due to its excellent film forming properties. As shown in the table above, a 23.5% Sodium Chloride solution with the added concentrated Xylooligosaccharide stream was found to be at least 70% less corrosive then NaCl alone.

The combination of the Xylose/Xylooligosaccharide solution concentrated to 58% mixed with 23% NaCl at a 1:1 ratio blended with 30% CaCl2 at 30/70 was found to improve friction characteristics by 70%.

The performance of the concentrated Xylose/Xylooligosacharide solution matches or exceeds the performance of current available organic sugar based additives from other industries, such as Raffinate, the residual liquid resulting from the de-sugaring of beet molasses.

Example 1

Batch steam pretreatment of corncob was carried out in a steam gun. The process included supplying the steam gun with saturated steam from a steam storage vessel, through a steam valve and with pre-steamed ground corncobs of 0.5 to 1 cm$^3$ particle size through a V-shaped hopper and screw auger. The amount of each batch load was controlled by a weigh hopper. Batch loads of 6 kg dry corncob were used per steam explosion shot. Pressurized saturated steam at temperatures of 190 to 210° C. was fed into the steam gun until the desired cooking pressure was reached. Cooking pressures of 180 to 275 psig were used (12.6 to 19.1 bar).

After a residence time of 3 to 10 minutes, the pressure in the steam gun was quickly released by opening a flash purge valve located at the bottom of the steam gun. Solids and gaseous reaction products ejected from the steam gun on pressure release are separated in a cyclone separator. The solids were collected at the bottom of the separator and are referred to in the following as pre-hydrolysed cob.

Pre-hydrolysed cob dry matter was diluted 16:1 with fresh water. The slurry was pressed to 40% solids in a hydraulic cylinder. The solids were then diluted with fresh water to the desired consistency for hydrolysis and fermentation. Wash water containing predominantly xylooligosaccharides was collected at about 1.3% solids. This is collectively called the xylooligosacharide solution as this is the predominate species.

The diluted xylose/xylooligosaccharide solution was concentrated 30:1 to afford the concentrated xylose/xylooligosaccharide solution. The solution was a dark tea color with a burnt caramel odor. The solution included approximately 39% solids, all of which were dissolved solids.

Approximately 80% of the cob hemicellulose is recovered in the xylooligosacharide solution obtained from the washing of the pre-hydrolyzed cob. Composition analysis of the xylooligosacharide solution (wash water) showed that the dissolved solids contained 80% soluble sugars, of which approximately 50% (see table 2 below) is Xylooligosaccharides & xylose (w/w) on a dry matter basis. The ratio of xylooligosaccharide:xylose:acetic acid in solution was about 30:16:4.

The concentrated Xylose/Xylooligosaccharide solution, which had a pH of 4.1 was mixed with finely divided Ca/Mg Carbonate to adjust the pH to 7.1, which has the added benefit of creating small amounts of calcium and magnesium acetate solids, which further improve the freeze proof properties of the solution.

The concentrated and pH adjusted Xylose/Xylooligosaccharide solution was mixed up to 50% w/v with 23% NaCl, 29% CaCl$_2$, 29% MgCl$_2$, or a mixed brine containing 15% CaCl+10% NaCl+3% MgCl$_2$. All mixtures produced homogenous solutions without any separation or sediments after 168 hours, at working temperatures of −15 C, −20 C, −24 C and −29 C respectively.

The mixtures were tested for their deicing ability and found to perform as well or better than specification for the equivalent brine solutions at their working temperatures, as outlined herein.

Example 2

A side stream from lignocellulosic biomass pretreatment solution, containing among other things hemicellulose, having 17.8% solids with a specific gravity of 1.0745 was used as starting material The side stream solution was concentrated in an 8 L beaker over an open flame with constant stirring. 100 ml samples were extracted from the beaker with every 25% reduction in the total volume. Once the total volume was down to 25%, the beaker was refilled with the starting side stream material. The extracted samples were tested for specific gravity, % solids and viscosity.

| % Solids | Specific Gravity @ 60° F. | Viscosity |
|---|---|---|
| 10.00 | 1.0425 | 1.9 |
| 17.80 | 1.0745 | 2.8 |
| 27.58 | 1.1130 | 3.1 |
| 35.00 | 1.1411 | 3.5 |
| 41.23 | 1.1717 | 3.8 |
| 49.70 | 1.2108 | 4.0 |
| 52.00 | 1.2247 | 4.3 |
| 57.77 | 1.2524 | 4.5 |
| 59.41 | 1.2602 | 5.1 |

The sample solution having 57.77% solids (the "57.77% solids solution") was selected for mixing with deicing solution for testing. The 57.77% solids solution was easily attainable without excessive heat degradation resulting in the side stream solution, and no residues or precipitates of any form were observed in this sample.

The 57.77% solids solution can readily be stored with minimal agitation at temperatures above 0° C. The 57.77% solids solution was mixed 1:1 (by volume) with the following chloride solutions to facilitate winterizing of the product:

1) 30% $CaCl_2$ solution (FP: −45° C.)
2) 23% NaCl solution (FP: −20.9° C.)
3) Mixed brine: 15.1% $CaCl_2$, 3% $MgCl_2$ and 9.2% NaCl (FP −32.8° C.)

Both calcium chloride bearing brines (1&3) produced a reaction/light brown precipitate when mixed with the 57.77% solids solution. The precipitate in the 30% calcium chloride was more prevalent than the precipitate that was produced with the mixed brine. The sodium chloride brine did not produce any reaction.

| Solution | Freezing point (° C.) |
|---|---|
| 57.77% solids solution | −3 |
| 30% $CaCl_2$ + 57.77% solids solution (1:1) | −22.5 |
| 23% NaCl + 57.77% solids solution (1:1) | −25.1 |
| Mixed brine + 57.77% solids solution (1:1) | −21.0 |

Surprisingly, The 23% sodium chloride solution exhibited a substantial decrease in the freezing point at −25.1 versus −20.9 from the original 23% sodium chloride concentration. As expected the 30% Calcium Chloride and the mixed brine solution both experienced a increase in their freezing point when mixed with the side stream 57.77% solids solution. The 30% Calcium Chloride solution exhibited the most significant decrease in its freezing point of −45° C. to −22.5° C.

The friction characteristics were tested to determine the effect of adding side stream solution to the salt deicing solutions. To test the effect of change in friction characteristics, the 57.77% solids solution with 23% sodium chloride in a 1:1 volume ratio was used as the benchmark additive to enhance the friction characteristics of the $CaCl_2$ solution.

Figure 2:
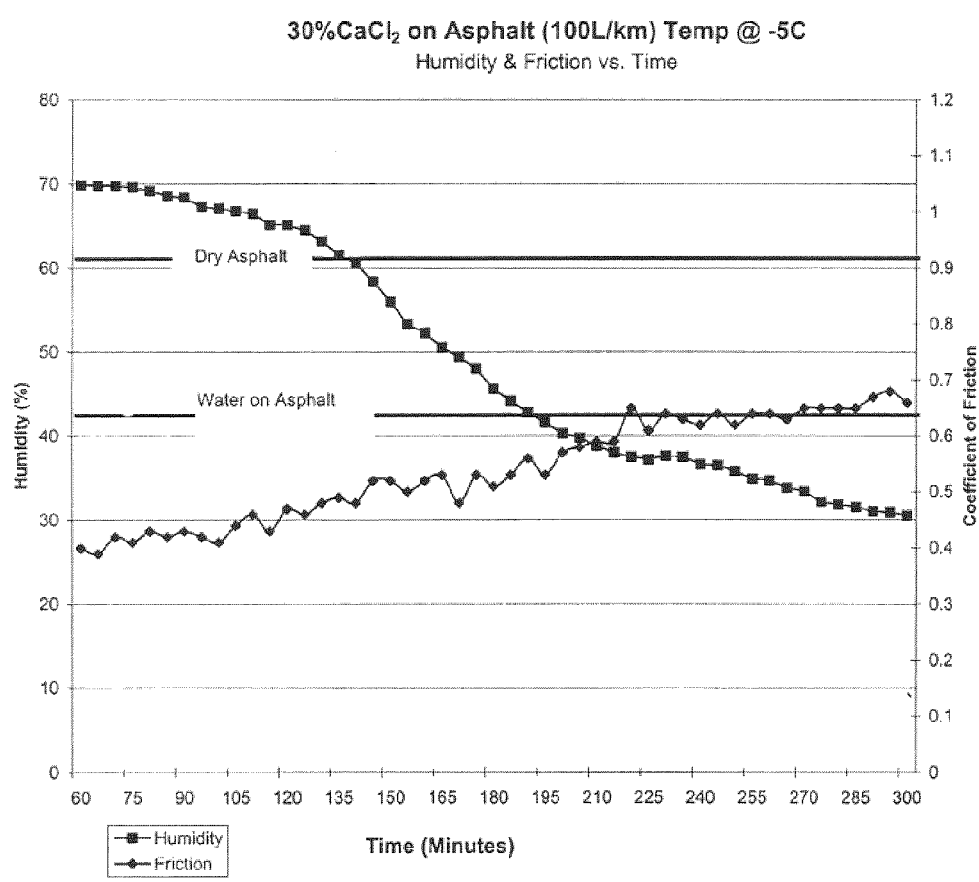
FIG. 2 shows a graph of humidity and friction versus time for 30% $CaCl_2$ on Asphalt (100 L/Km) at a temperature of −5° C.
Figure 3:
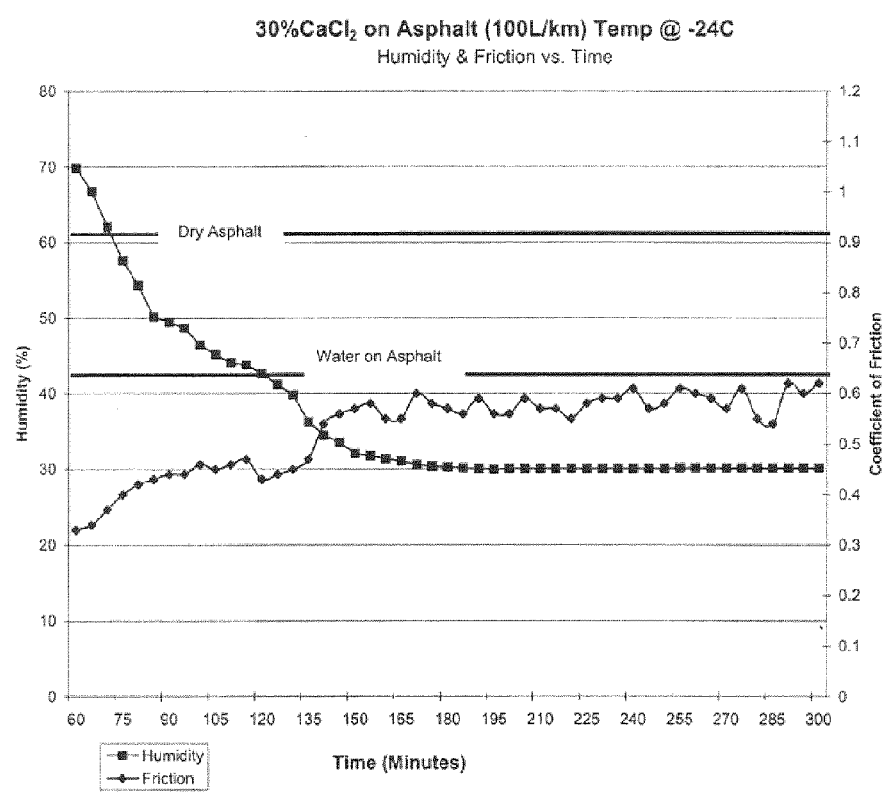
FIG. 3 shows a graph of humidity and friction versus time for 30% $CaCl_2$ on Asphalt (100 L/Km) at a temperature of −24° C.
Figure 4:
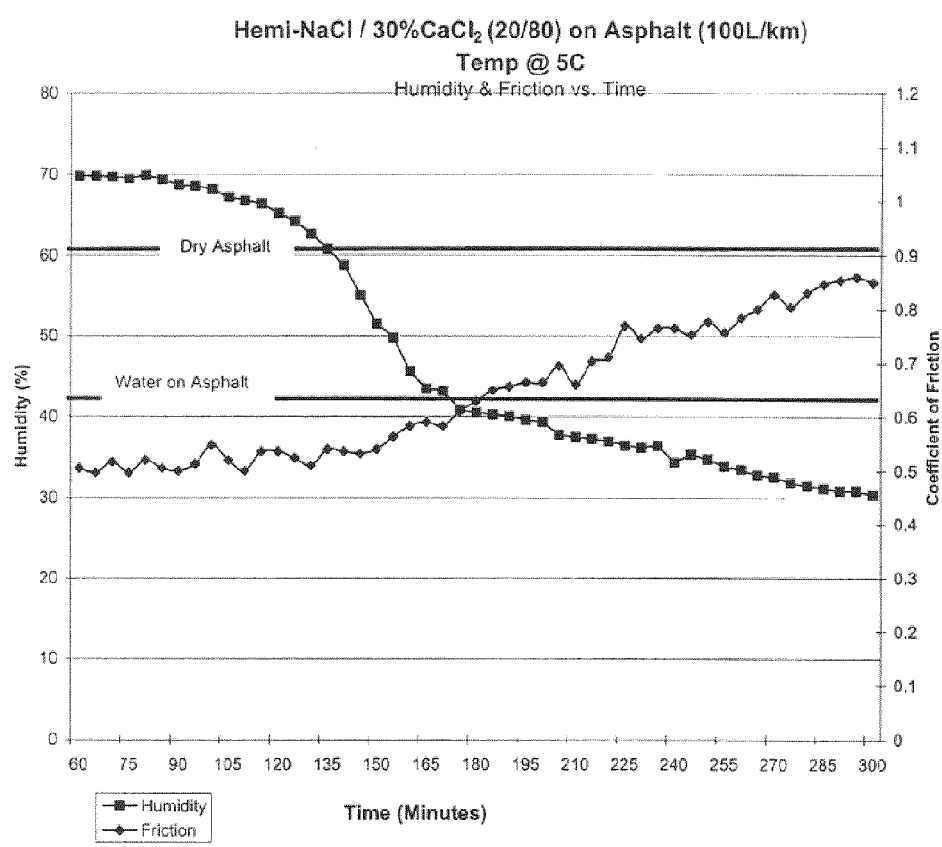
FIG. 4 shows a graph of humidity and friction versus time for 57.77% solids solution and NaCl mixture/30% $CaCl_2$ (20/80) on Asphalt (100 L/Km) at a temperature of 5° C.
Figure 5:
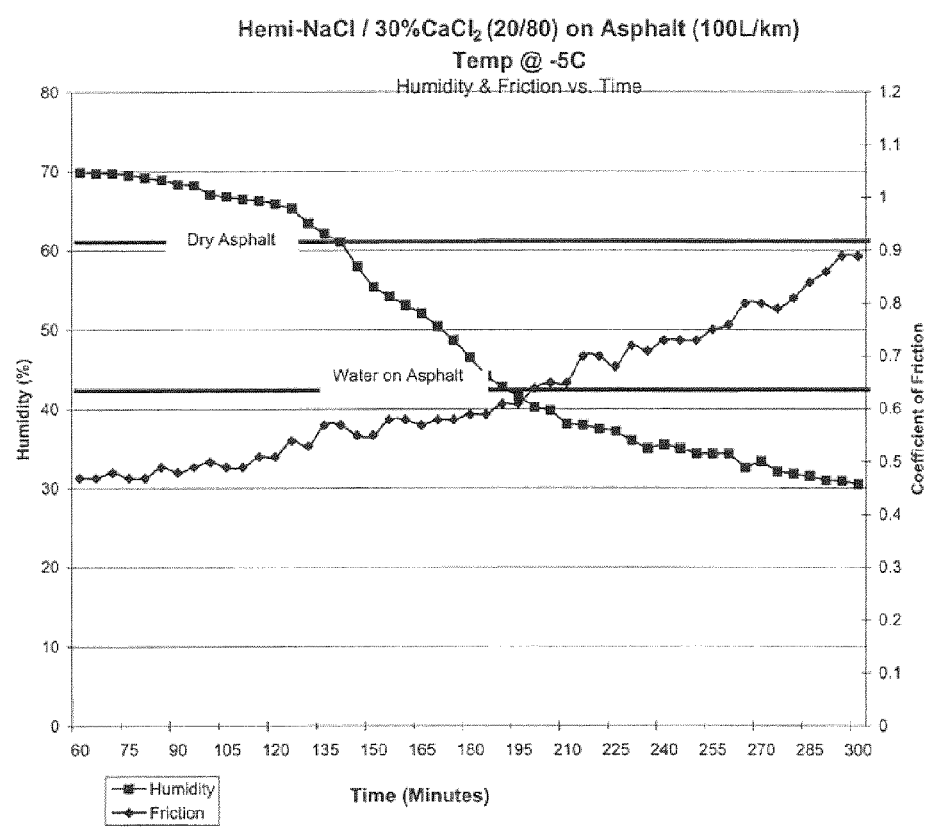
FIG. 5 shows a graph of humidity and friction versus time for 57.77% solids solution and NaCl mixture/30% $CaCl_2$ (20/80) on Asphalt (100 L/Km) at a temperature of −5° C.
Figure 6:
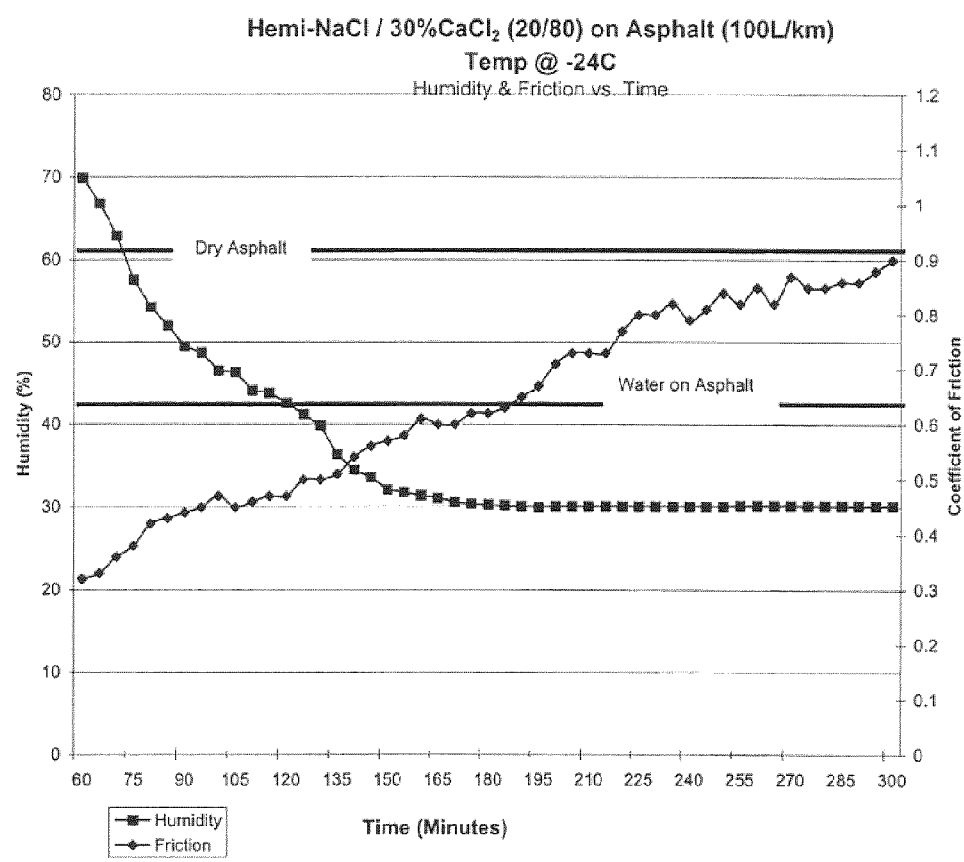
FIG. 6 shows a graph of humidity and friction versus time for 57.77% solids solution and NaCl mixture/30% $CaCl_2$ (20/80) on Asphalt (100 L/Km) at a temperature of −24° C.
Figure 7:
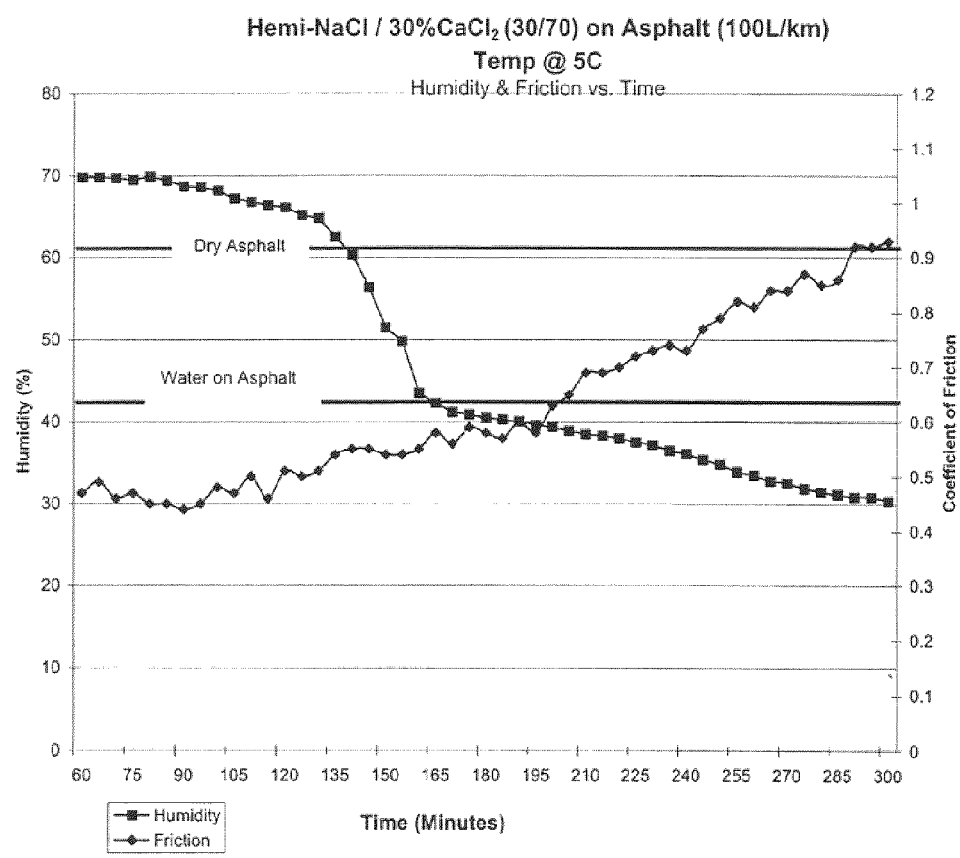
FIG. 7 shows a graph of humidity and friction versus time for 57.77% solids solution and NaCl mixture/30% $CaCl_2$ (30/70) on Asphalt (100 L/Km) at a temperature of 5° C.
Figure 8:
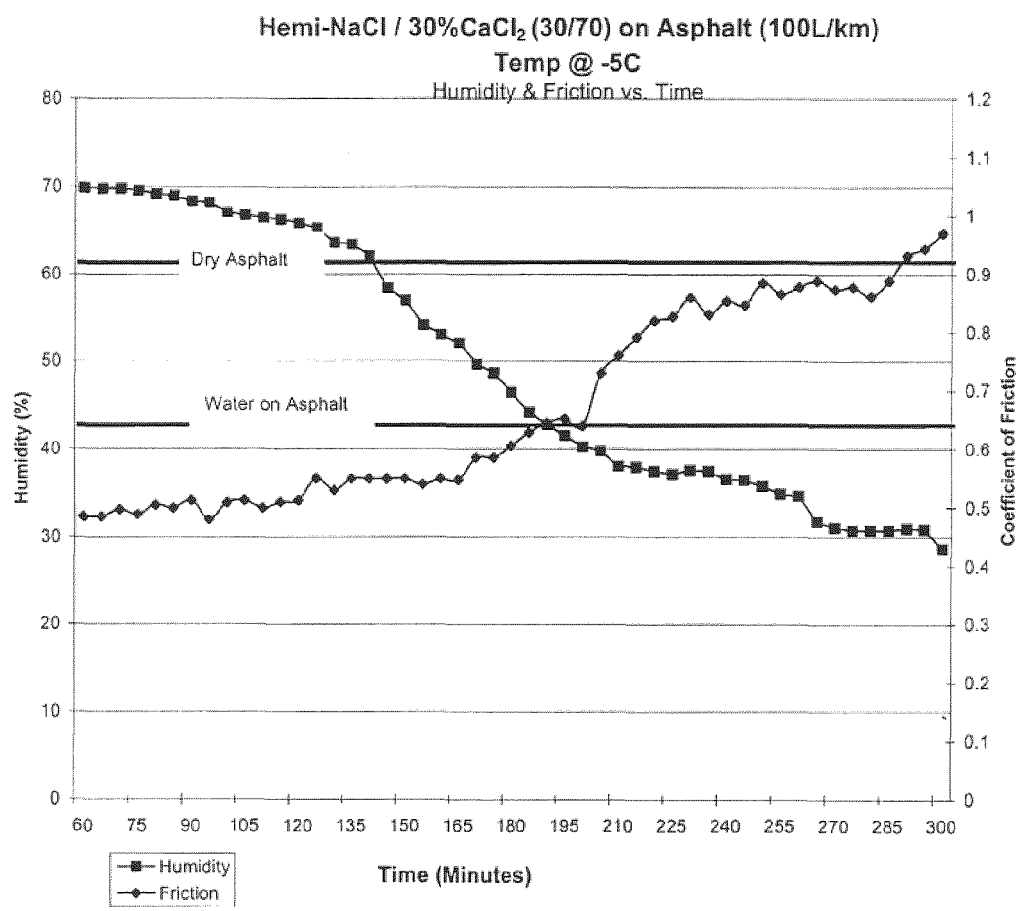
FIG. 8 shows a graph of humidity and friction versus time for 57.77% solids solution and NaCl mixture/30% $CaCl_2$ (30/70) on Asphalt (100 L/Km) at a temperature of −5° C.
Figure 9:
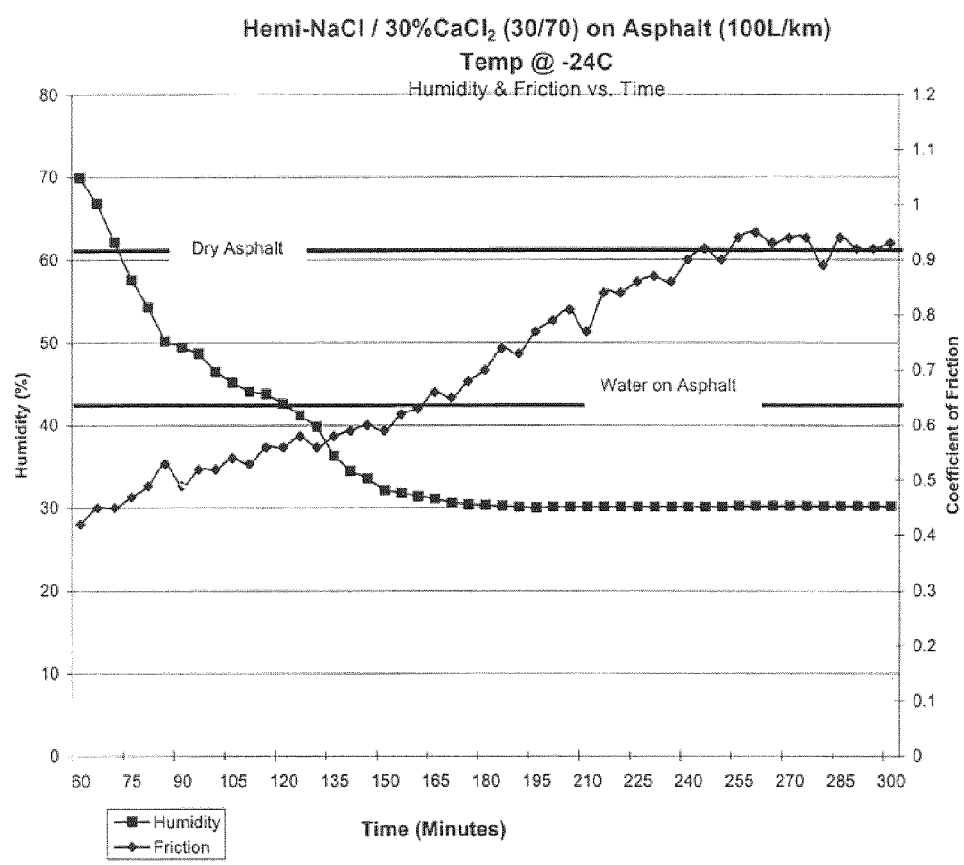
FIG. 9 shows a graph of humidity and friction versus time for 57.77% solids solution and NaCl mixture/30% $CaCl_2$ (30/70) on Asphalt (100 L/Km) at a temperature of −24° C.

The results of tests are shown in FIGS. 1 to 9. These results are summarized in the table below.

Results: Friction tests were conducted at an addition rate of 100 L/lane km.

| | Solution | Ambient Temp ° C. | Average Friction | % Improvement vs $CaCl_2$ |
|---|---|---|---|---|
| 1 | 30% $CaCl_2$ | +5 | 0.51 | 0 |
| 2 | 30% $CaCl_2$ | −5 | 0.53 | 0 |
| 3 | 30% $CaCl_2$ | −24 | 0.52 | 0 |
| 4 | 57.77% solids solution + 23% NaCl (1:1) into 30% $CaCl_2$ (20/80) | +5 | 0.63 | 19.0 |
| 5 | 57.77% solids solution + 23% NaCl (1:1) into 30% $CaCl_2$ (20/80) | −5 | 0.62 | 14.5 |
| 6 | 57.77% solids solution + 23% NaCl (1:1) into 30% $CaCl_2$ (20/80) | −24 | 0.63 | 17.5 |
| 7 | 57.77% solids solution + 23% NaCl (1:1) into 30% $CaCl_2$ (30/70) | +5 | 0.62 | 17.7 |
| 8 | 57.77% solids solution + 23% NaCl (1:1) into 30% $CaCl_2$ (30/70) | −5 | 0.66 | 19.7 |
| 9 | 57.77% solids solution + 23% NaCl (1:1) into 30% $CaCl_2$ (30/70) | −24 | 0.70 | 25.7 |

As shown, the addition of the 57.77% solids solution mixed with 23% NaCl enhanced the friction properties of the 30% $CaCl_2$ between an average of 14.5 and 25.7%.

The 57.77% solids solution when used in combination with 23% NaCl in a 1:1 ratio, produces a solution that is storable down to −25° C. This −25° C. temperature exceeds the freeze point of 23% NaCl and the 57.77% solids solution. The 30/70 ratio was further tested and the solution freezing point remained below −35° C.

To test the friction properties, a 4" by 4" test sled made from a rubber compound from all season radial tires was pulled over a surface of dry asphalt. The test was repeated again using water and liquid deicers at similar addition rates used in deicing of roads. The test was run in a controlled environment that monitored temperature, humidity, and airflow. The coefficient of kinetic friction is equal to the force scale reading of the pull force divided by the normal force caused by the weight of the sled.

The tests were conducted in a room which was maintained at a relative humidity of 30%. A 28 cubic foot freezer was equipped with an air curtain and maintained at desired temperatures within 1° accuracy. A steaming kettle was placed within the freezer enclosure to raise the relative humidity to 70%.

Once the desired humidity level was reached, a first sample was placed on the test bed for 16 minutes to enable sufficient time to equilibrate. The sample was weighed on a balance an evenly distributed onto an asphalt surface. The air pump was started to deliver wind speed over the asphalt of between 1 and 5 km/h.

The 4" by 4" rubber sled was formed by fixing all season radial tire rubber with epoxy adhesive to a one ½ inch steel plate. A hook was fixed to the steel plate to enable pulling the sled. The entire sled assembly weighed 11 lbs. The sled was pulled using a force gauge to monitor the pound force pulling the sled. The length of the test bed was covered within 0.1 seconds.

The test bed consisted of a sliding surface of 4" by 12" which was formed in the asphalt surface. A groove 1½ inch deep was cut into the asphalt on either side of the 4" track to facilitate easier clean up between the runs.

The addition rate of the deicer onto the test bed was 0.52 ml/s to simulate a field application rate of 60 L per lane km. An addition rate of 0.86 ml/s was used to mimic a field application rate of 100 L per lane km. The quantity of deicer is very small to be delivered volumetrically. A sample size was calculated by weighing the sample on a 4 place balance using a polyethylene dish to deliver the test bed whereby the number of grams of sample equals the specific gravity of the sample multiplied by 0.52 ml/s.

The tests were repeated in 5 minute increments. Between tests, the test bed surface was washed in distilled water and dried. The air pump continued to exchange the air within the freezer with the low humidity air in the room. A velocity of the air current was selected at 2 km/h which was sufficient to drop the humidity to a desired level.

Example 3

Further experiments were conducted using by-products from lignocellulosic biomass processing which included a pre-treatment hydrolysis step prior to the processing. In particular, the pre-treatment was either dilute acid hydrolysis ("DAP") or high pressure autohydrolysis ("HPA"). An example of HPA is described in Example 1.

Because these by-products are more acidic, a base was used to neutralize the pH. Table 1 below shows properties of samples of by-products from lignocellulosic biomass processing using DAP and HPA, the base added to adjust pH, the value of the pH adjusted to, the amount of base required to adjust, and the eutectic temperature (freezing point) of the solution. The starting pH of the samples were as follows: C5-DAP add back 1.61; C5-DAP-as is 1.63; C-5HPA-add back 3.42; and C5-HPA-as is 3.70. The samples which are identified with "add back" were samples where vapors were collected during the DAP and HPA pre-treatment and condensed and added back. As such the "add back" samples contain additional acetic acid which lowers the pH and increases the concentration of weak acid thus requiring more base to neutralize the samples.

TABLE 1

| Sample Name | Condensate add-back | pH | Base used | Amount base req. to adjust pH | Eutectic Temp (° C.) (Triplicate-Adverage) |
|---|---|---|---|---|---|
| C5-DAP - add back | Yes | 6 | K$_2$CO$_3$ | 58.7 g/L | −20.8 |
| C5-DAP - as is | No | 6 | K$_2$CO$_3$ | 48.9 g/L | −18.5 |
| C5-DAP - add back | Yes | 7 | K$_2$CO$_3$ | 67.5 g/L | −23.4 |
| C5-DAP - as is | No | 7 | K$_2$CO$_3$ | 64.0 g/L | −20.4 |
| C5-DAP - add back | Yes | 7 | NH$_4$OH | 58.2 ml/L | −15.2 |
| C5-DAP - as is | No | 7 | NH$_4$OH | 43.3 ml/L | −14.6 |
| C5-HPA - add back | Yes | 6 | K$_2$CO$_3$ | 35.6 g/L | −10.6 |
| C5-HPA - as is | No | 6 | K$_2$CO$_3$ | 31.5 g/L | −9.7 |
| C5-HPA - add back | Yes | 7 | K$_2$CO$_3$ | 42.0 g/L | −11.8 |
| C5-HPA - as is | No | 7 | K$_2$CO$_3$ | 32.8 g/L | −10.1 |
| C5-HPA - add back | Yes | 7 | NH$_4$OH | 32.7 ml/L | −7.2 |
| C5-HPA - as is | No | 7 | NH$_4$OH | 19.6 ml/L | −9.4 |

As shown, the eutectic temperature for the samples using by-products from a process using DAP ranged from −14.6 to −23.4. The eutectic temperature for the samples using by-product from a process using HPA ranged from −7.2 to −11.8. Thus the freezing point was lowered significantly such that the samples could be used as deicing and ice formation preventing products without further adding salt such as sodium chloride. This is particularly the case with the "C5-DAP— add back" sample which was neutralized with potassium carbonate and resulted in a eutectic temperature of −23.4.

By not adding salts used in conventional deicing compositions, the samples are less environmentally damaging including being less corrosive.

Table 2 shows a break-down of the compounds in the samples of DAP and HPA which include the condensate add-back. In addition to the compounds shown, the samples have a balance of salts, protein, fat, dissolved lignin, resins, etc.

TABLE 2

| | | Sample | |
|---|---|---|---|
| | | DAP | HPA |
| | pH | 2.40 | 3.60 |
| | Gas Chromatograph | GC | GC |
| Oligomers & monomers | Arabinose & Araban Oligomer | 6.8% | 5.1% |
| | Xylose & Xylan Oligomer | 60.8% | 50.8% |
| | Mannose & Mannan Oligomer | 0.5% | 0.3% |
| | Galactose & Galactan Oligomer | 3.1% | 2.4% |
| | Glucose & Glucose Oligomer | 9.2% | 6.4% |
| High Performance Liquid Chromatograph | | HPLC | HPLC |
| monomers | Glucose | 4.7% | 1.0% |
| | Xylose, Mannose & Galactose | 48.3% | 9.9% |
| | Arabinose | 5.4% | 2.7% |
| | Formic acid | | 0.9% |
| | Acetic acid | 7.6% | 4.0% |
| | Furfural | 5.4% | 1.5% |
| Ratio | Glucose mono/oligo | 0.51 | 0.16 |
| | Xylose mono/oligo | 0.75 | 0.19 |
| | Sulphuric Acid | Est 2.4% | None |

The concentrations of constituents of the samples shown are in accordance with sample embodiments. It is appreciated that the concentration of constituents will vary depending on the sample used. As shown, the DAP sample has about 2.4% sulfuric acid whereas the HPA sample has none. This is why more base is required to balance the pH as shown in Table 1.

The use of the potassium carbonate base was advantageous over the calcium/magnesium carbonate from Examples 1&2 in that it significantly reduced the eutectic temperature. In particular, it has a practical working temperature low enough that it may be stored outside in winter without needing to be premixed with chloride salts and most advantageously can be used as a deicing and ice melting product on its own which further improves the corrosion and road friction benefits seen from the blended compositions described in Examples 1 and 2.

It would be understood by those skilled in the art that a combination of bases and levels of chloride salts can be used to tailor the solution for the particular environment it is to be used in, thus balancing the cost of the formulation. The use of the potassium and ammonia bases may prove to be more expensive than the calcium/magnesium blend. By balancing the base used and chloride salts addition, one skilled in the art can find a ideal balance for corrosivity reduction, road friction, environmental benefits and cost.

The Xylose/Xylooligosacharide concentrates provide a innovative new material to benefit any jurisdiction that uses corrosive, slippery and environmentally damaging chloride road salts.

The invention claimed is:

1. A surface ice melting or surface ice formation inhibiting composition, the composition comprising water soluble hydrolysed hemicellulose carbohydrates of various degrees of polymerization, sugar monomers, acetic acid, and furfural, all derived from a lignocellulosic biomass to fuel conversion process, wherein the hydrolyzed hemicellulose carbohydrates are concentrated by evaporation of water after washing to 25% to 70% total solids.

2. The composition of claim 1, wherein the composition has improved properties including reducing corrosion activity of the ice melting and/or ice formation inhibiting composition.

3. The composition of claim 1, wherein the composition has improved properties including increasing friction properties of a surface to which the ice melting and/or ice formation inhibiting composition is applied.

4. The composition of claim 1, wherein composition has improved properties including improving colloidal dispersivity of the ice melting and/or ice formation inhibiting composition.

5. The composition of claim 1, further comprising formic acid.

6. The composition of claim 1, including water soluble xylose and xylooligosaccharides of various molecular weights.

7. The composition of claim 1, wherein the lignocellulosic biomass to fuel conversion process is a thermal steam treatment process and the water soluble hydrolysed hemicellulose carbohydrates, sugar monomers, acetic acid, and furfural, are all derived from a lignocellulosic biomass separated from a solid lignocellulose biomass fraction during the thermal steam treatment process.

8. The composition of claim 7, wherein the thermal steam treatment process uses an acid catalyst.

9. The composition of claim 8, wherein the acid catalyst is sulfuric acid.

10. The composition of claim 1, wherein the pH is increased to between 6 and 8 using a base.

11. The composition of claim 10, wherein the base is selected from the group consisting of Calcium Carbonate, Magnesium Carbonate, Calcium Hydroxide, Sodium Hydroxide Potassium Carbonate, Potassium Hydroxide, Ammonium Hydroxide, and mixtures thereof.

12. The composition of claim 10 mixed 1:1 with a NaCl solution then further blended with a $CaCl_2$ solution to form a surface ice melting and ice formation inhibiting salt composition with increased friction properties.

13. The composition of claim 10 mixed 1:1 with a 23% NaCl solution then further blended with a $CaCl_2$ solution to form a surface ice melting and ice formation inhibiting salt composition with increased friction properties.

14. The composition of claim 10 mixed 1:1 with 23% NaCl solution then blended with 30% $CaCl_2$ solution at a ratio of 30:70 solution to form a surface ice melting and ice formation inhibiting salt composition with increased friction properties.

15. The composition of claim 10 mixed 1:1 with 23% NaCl solution then blended with 30% $CaCl_2$ solution at a ratio of 20:80 solution to form a surface ice melting and ice formation inhibiting salt composition with increased friction properties.

16. The composition of claim 10 mixed with salt solutions of $CaCl_2$, $MgCl_2$, or NaCl and mixtures thereof to provide a surface ice melting and ice formation inhibiting salt composition with increased friction properties.

17. The composition of claim 1, wherein the products derived from the lignocellulosic biomass to fuel conversion process comprise: approximately 6-8% arabinose and arabian oligomers; approximately 48-72% xylose and xylan oligomers; approximately 0-1% mannose and mannan oligomers; 2.5-3.5% galactose and galactan oligomers; approximately 8-11% glucose and glucose oligomers, approximately 2-3% sulphuric acid, and a balance of salts, protein, fat, dissolved lignin and resins.

18. The composition of claim 17, wherein a base selected from the group consisting of potassium carbonate and ammonium hydroxide is added to the composition to adjust the pH to between 6 and 8.

19. The composition of claim 17, wherein the products derived from the lignocellulosic biomass to fuel conversion process comprise: approximately 4-6% arabinose and arabian oligomers; approximately 40-60% xylose and xylan oligomers; approximately 0-1% mannose and mannan oligomers; 2-3% galactose and galactan oligomers; approximately 5.5-7.5% glucose and glucose oligomers, and a balance of salts, protein, fat, dissolved lignin and resins.

20. The composition of claim 19, wherein a base selected from the group consisting of potassium carbonate and ammonium hydroxide is added to the composition to adjust the pH to between 6 and 8.

21. A method for surface deicing or for inhibiting surface ice formation, comprising the steps of:
applying the composition of claim 10 to rock salt to obtain treated rock salt, and
applying the treated rock salt to a road surface for deicing and/or ice formation inhibition.

22. A method for maintaining salts in a liquid salt composition in suspension, comprising the steps of obtaining a liquid salt composition and adding the composition of claim 10 for maintaining the liquid salt in suspension.

23. A method for surface deicing or for inhibiting surface ice formation, comprising the steps of:
adding the composition of claim 10 to a water solutions of NaCl, $CaCl_2$, or $MgCl_2$, or mixtures thereof, and
applying the resulting salt composition to a surface for surface ice melting or surface ice formation inhibition.

24. A method for surface deicing or for inhibiting surface ice formation, comprising the steps of:
adding the composition of claim 10 to aqueous brine solutions of NaCl, $CaCl_2$, or $MgCl_2$ or mixtures thereof at a ratio of up to 50/50 by weight and
applying the resulting brine composition to a surface for surface ice melting or surface ice formation inhibition.

* * * * *